United States Patent
Davis

(10) Patent No.: US 11,496,617 B2
(45) Date of Patent: Nov. 8, 2022

(54) CAR SURVEILLANCE SYSTEM

(71) Applicant: Jeremy Davis, Bloomington, MN (US)

(72) Inventor: Jeremy Davis, Bloomington, MN (US)

(*) Notice: Subject to any disclaimer, the term of this patent is extended or adjusted under 35 U.S.C. 154(b) by 0 days.

(21) Appl. No.: 16/575,959

(22) Filed: Sep. 19, 2019

(65) Prior Publication Data

US 2021/0029239 A1    Jan. 28, 2021

Related U.S. Application Data

(63) Continuation of application No. 16/566,507, filed on Sep. 10, 2019.

(60) Provisional application No. 62/877,255, filed on Jul. 22, 2019.

(51) Int. Cl.
*H04M 1/725* (2021.01)
*H04M 1/72424* (2021.01)
*H04W 4/90* (2018.01)
*H04W 4/029* (2018.01)

(52) U.S. Cl.
CPC ....... *H04M 1/72424* (2021.01); *H04W 4/029* (2018.02); *H04W 4/90* (2018.02); *H04M 2242/04* (2013.01); *H04M 2242/30* (2013.01); *H04M 2250/52* (2013.01)

(58) Field of Classification Search
CPC .... H04W 4/029; H04W 4/90; H04M 2/72541
USPC ........................... 455/404.2, 456.1
See application file for complete search history.

(56) References Cited

U.S. PATENT DOCUMENTS

| | | | |
|---|---|---|---|
| 5,986,543 A * | 11/1999 | Johnson | B60R 25/102 340/426.19 |
| 7,136,747 B2 | 11/2006 | Raney | |
| 8,224,571 B2 | 7/2012 | Huang | |
| 9,999,076 B2 | 6/2018 | Huai | |
| 10,246,014 B2 | 4/2019 | Levkova et al. | |
| 10,249,159 B2 | 4/2019 | Guerzoni | |
| 10,301,867 B2 | 5/2019 | Truong | |
| 10,388,134 B1 * | 8/2019 | Slavin | G08B 13/19654 |
| 10,453,150 B2 | 10/2019 | Thompson et al. | |
| 2009/0181640 A1 | 7/2009 | Jones | |
| 2009/0187300 A1 * | 7/2009 | Everitt | G01C 21/3602 701/31.4 |

(Continued)

OTHER PUBLICATIONS

Kansal, Sachin, RideCheck:Connecting You with Help When You Need it, Sep. 17, 2019, 1-2, [online], [retrieved on Jan. 6, 2019]. Retrieved from the internet <https://www.uber.com/newsroom/ridecheck/> Uber Newsroom, United States of America.

(Continued)

*Primary Examiner* — Congvan Tran
(74) *Attorney, Agent, or Firm* — KandareIP, LLC; Anthony Kandare

(57) ABSTRACT

A safety system particularly for a transport service software application. The system integrates into an existing transport service software application communicates with a cellular network mobile device of a transport service driver or at least one passenger located in a vehicle offering rideshare services. In an emergency, a user of the system may press a panic button on the application. The mobile device activates its camera and microphone turns on to livestreams audio and video to emergency personnel, and transmits GPS data to said emergency personnel.

20 Claims, 1 Drawing Sheet

(56) References Cited

U.S. PATENT DOCUMENTS

| | | | |
|---|---|---|---|
| 2009/0191839 A1* | 7/2009 | Cannon, Jr. | G08B 25/009 455/404.1 |
| 2010/0245582 A1* | 9/2010 | Harel | G08B 13/19695 348/159 |
| 2011/0111728 A1 | 5/2011 | Ferguson | |
| 2012/0041675 A1* | 2/2012 | Juliver | G06Q 30/0283 701/465 |
| 2012/0162423 A1* | 6/2012 | Xiao | B60R 1/00 348/148 |
| 2013/0005294 A1* | 1/2013 | Levinson | G08B 25/005 455/404.1 |
| 2013/0271277 A1* | 10/2013 | McCauley | G08B 7/06 340/517 |
| 2014/0087780 A1* | 3/2014 | Abhyanker | H04W 4/90 455/521 |
| 2014/0162590 A1 | 6/2014 | DiPerna | |
| 2014/0375800 A1 | 12/2014 | Lim | |
| 2015/0145991 A1 | 5/2015 | Russel | |
| 2016/0100093 A1* | 4/2016 | Schield | H04N 1/2158 348/211.3 |
| 2017/0064262 A1 | 3/2017 | Mozer | |
| 2017/0124834 A1* | 5/2017 | Pedersoli | G08B 27/001 |
| 2017/0230605 A1* | 8/2017 | Han | H04N 5/77 |
| 2018/0308344 A1* | 10/2018 | Ravindranath | G08B 27/001 |
| 2018/0370485 A1* | 12/2018 | Takatsuka | B62M 6/45 |
| 2019/0019114 A1* | 1/2019 | Medvedovskiy | G06Q 10/02 |
| 2019/0114902 A1* | 4/2019 | Lazarski | G08B 25/016 |
| 2019/0141756 A1* | 5/2019 | Lei | H04L 67/34 |
| 2019/0158743 A1 | 5/2019 | Axson et al. | |
| 2019/0286948 A1 | 9/2019 | Sathyanarayana et al. | |
| 2019/0373219 A1* | 12/2019 | Sautner | G06K 9/00744 |
| 2019/0385239 A1 | 12/2019 | Thompson et al. | |
| 2020/0236525 A1* | 7/2020 | Paulin | H04W 4/12 |

OTHER PUBLICATIONS

Segarra, Lisa Marie, Uber Now Knows If Your Ride Has Gone Wrong—By Tapping Your Smartphone Sensors, Sep. 17, 2019, [online],[retrieved on Jan. 6, 2019]. Retrieved from the internet <https://fortune.com/2019/09/17/uber-ridecheck-safety-feature/> Fortune Media IP Limited, California, United States of America.

DisplayRide, San Jose, California, United States of America Jul. 9, 2019, [online], [retrieved on Jan. 7, 2019]. Retrieved from the internet <URL:http://www.displayride.com>.

UberPeople post entitled "Nauto—dash cam offer by Uber . . . Big brother?" 1 page, posted Jul. 8, 2019 by user"Maxalto", [retrieved on Jan. 6, 2019]. Retrieved from Internet: <https://uberpeople.net/threads/nauto-dash-cam-offer-by-uber-big-brother.338709/>.

Screen captures from YouTube video clip entitled "The Nauto Connected Dashcam for Uber Driver-Partners" 5 pages, uploaded on Oct. 8, 2019 by user "Nauto" Retrieved from Internet: <http://www.youtube.com/nauto>.

* cited by examiner

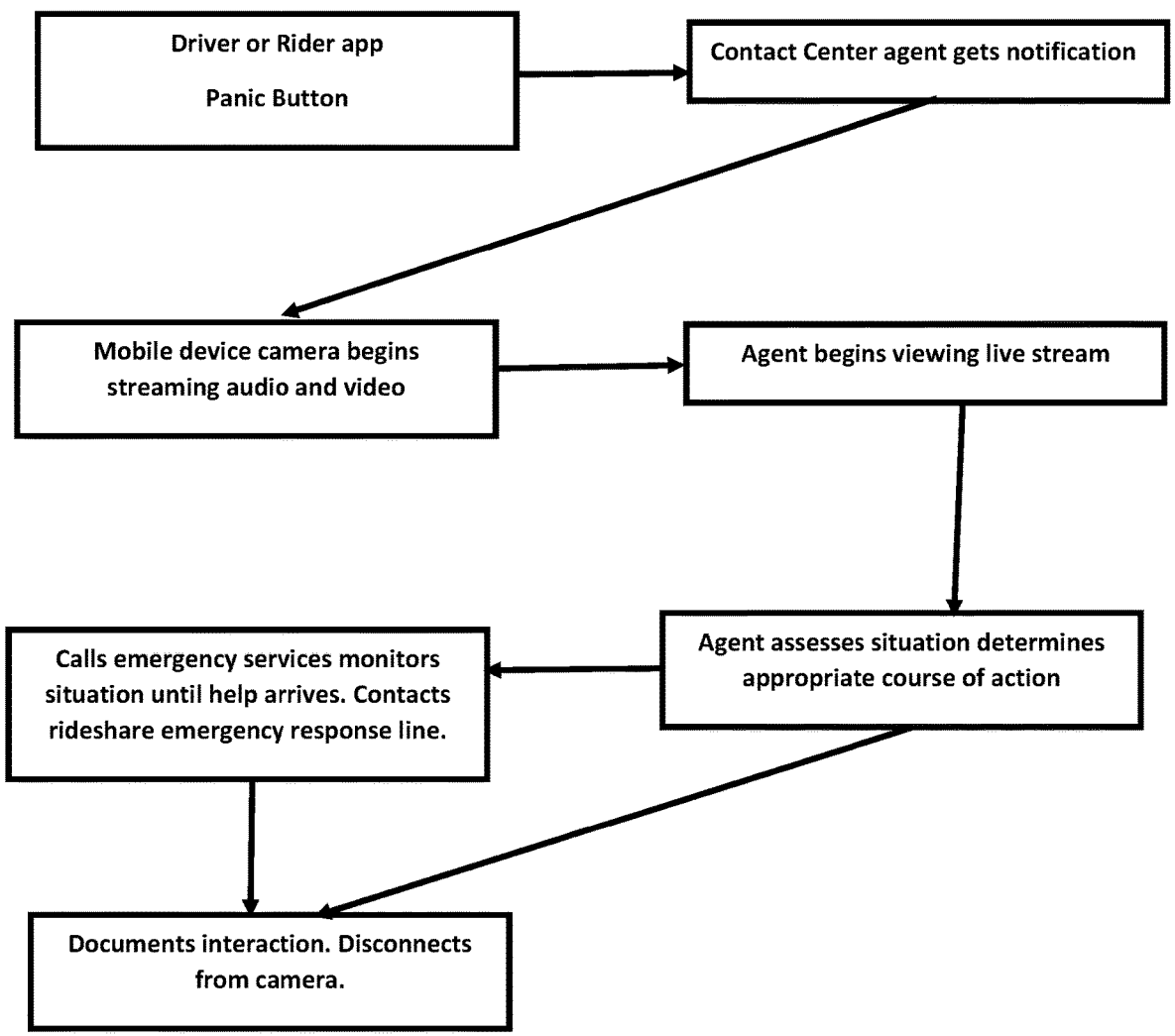

CAR SURVEILLANCE SYSTEM

CROSS REFERENCE TO RELATED APPLICATIONS

The present application is continuation-in-part of application Ser. No. 16/566,507, filed Sep. 10, 2019, which claims the benefit of priority of application for Jeremy Davis, Application No. 62/877,255, filed on Jul. 22, 2019. The present application also claims the benefit of priority based on Application for Jeremy Davis, Application No. 62/877,255, filed on Jul. 22, 2019. The disclosure of both application Ser. No. 16/566,507 and 62/877,255 are incorporated herein by reference in its entirety.

BACKGROUND OF THE INVENTION

(a) Field of the Invention

This application relates to ridesharing in a transportation service vehicle and, in particular, to a system for surveillance of a transportation vehicle that enables rideshare drivers and passengers to communicate with emergency response units after initiating a distress signal while live streaming via a mobile device.

(b) Related Prior Art

The prior art of ridesharing vehicle safety and surveillance system are:

U.S. Pat. No. 7,136,747 issued Nov. 14, 2006, to Stephen Raney teaches a GPS-tracking system that alerts a safety subsystem of the status and location of passengers that are carpooling. System must be manually configured in order to determine whether a situation is critical.

U.S. Pat. No. 8,862,092 issued Oct. 14, 2014, to Philip Reitnour teaches an emergency notification system via a mobile device application. The application relies on user's telephone to obtain audiovisual information and sends images periodically to a remote server. The information stored in the server is then relayed to 911 emergency services, sent or backed up in a storage location, or sent to emergency contacts.

U.S. Pat. No. 9,454,889 issued Sep. 27, 2016, to Dan Kerning et. al teaches an application for a client device which may improve the personal security of an individual and public. It utilizes a Blue-Phone-in-Pocket (bPip) module to operate comparable to, but more effectively than, the traditional college campus blue light phone. When the user of the module toggles a button on the GUI of the users smartphone, the App may instantly record and transmit key information to a command center, which operates to provide assistance to the student, at their current location, without requiring the student to relocate to one of the tradition blue light phone fixtures. A tracking module permits the student or other user to be tracked by his/her device until safely reaching a travel destination. The person may trigger an alarm if endangered during the trip, which may prompt a response from local law enforcement, and other assigned individuals.

U.S. Pat. No. 7,750,799 Jul. 6, 2010, to Rhonda L. Childress et al. teaches of an apparatus, system, and method that allows users in distress to communicate with an Emergency Response Center by only pressing an alert notification and a messaging system. It provides a means for a person in distress to use a mobile device to communicate covertly with an Emergency Response Center. The means contains a response designed not to alert an abductor of the communication as well as to indicate whether the person is indeed in distress. The means also allows the Emergency Response Center to locate both the distressed person and a mobile device using GPS or triangulation. The device may be in regular operation mode or in distress mode. When the device is in the distress mode, it will appear to be in normal operating mode if in operation or it will appear to be off. In addition, the device may be used for forensic purposes since it may provide voice and video data of the situation at an emergency location to the Emergency Response Center use a mobile device to communicate covertly with an Emergency Response Center.

U.S. Pat. No. 8,224,571 issued Jul. 17, 2012, to Qingfeng Huang teaches a system for rideshare security that only safeguards the participants via a rideshare participant device. The rideshare device is triggered while a ride is in progress. A security responder is only notified if the system identifies an inconsistency with security information it analyzes.

US Patent Application 2011/0111728 published May 12, 2011, to Daniel Lee Ferguson teaches a system and method for providing a conduit to send information to emergency services from a wireless device. Systems and methods for registering an alarm button on a wireless device and sending to public and/or private emergency service provider information related to the wireless device including its location, information about a wireless device end user and/or subscriber associated with the wireless device, and information recorded by one or more wireless devices during and subsequent to the time the alarm button is activated.

US Patent Application 2014/0162590 published Jun. 12, 2014, to Samantha DiPerna teaches a mobile device that has a camera, location, and transmission unit. In addition, the mobile device has a mechanism for self-defense and a panic button. The transmission unit can send at least one image from the camera unit, and audio and location data. The panic button activates the camera, the location unit, the transmitting unit, and the self-defense mechanism.

U.S. Pat. No. 10,301,867 issued May 28, 2019, to Michael Truong teaches an anomaly detection system in connection with a transport service. The anomaly detection system monitors the progress of the transport service and determines the probability of an anomaly occurring by monitoring the position of a driver's vehicle. If the vehicle has been in a certain position, e.g., static, it will transmit a notification to the transport service driver or at least one of the transport service passenger mobile devices.

An example emergency that is still present for carpooling and ridesharing is carjacking. Today many vehicles are already equipped with Global Positioning System (GPS) transmitters. So even if a car is stolen law enforcement the car can easily be tracked and located by law enforcement. However, in cases where a carjacker takes the driver as a hostage having a GPS system alone is not enough to decrease and prevent emergencies and personal risk of harm.

A panic button is a useful invention that aides passengers and drivers that are in an emergency situation. A panic button may be pre-programmed to contact a designated family member, doctor, or law enforcement etc. Coupled with GPS, a panic button is an effective solution to threats to safety and security during rideshare. However, after the panic button is pressed there is no way to continuously and visually identify the individuals, the degree, and assist drivers and passengers in the ridesharing industry today.

The prior art devices appear to fail to singly provide a transport service or rideshare application with a panic button, live streaming of audio and video via a mobile device for rideshare drivers and passengers in the vehicle, location system and emergency personnel notification in functional combination. The benefits of using the invention is detailed further in this description.

BRIEF SUMMARY OF THE INVENTION

Rideshare companies provide an incredibly convenient and inexpensive method of travel. However, the client is always put at risk, putting their safety into a stranger's hands. Rideshare services may do their due diligence in examining the rideshare drivers, and accidents and emergencies can still occur.

The present invention can make sure that ridesharing passengers and drivers are safe and receive assistance throughout an ongoing emergency.

Ridesharing apps and companies will continue to grow. They are cost-effective and are popular among younger generations that are owning cars less and opting for using more rideshare. However, surveys also show that a major barrier to growth for ridesharing drivers and passengers is safety. The safety problem is solved by this invention providing users with a safety and surveillance system for rideshare drivers and passengers. The system integrates into existing rideshare software applications and communicates with a cellular network connected to the dash camera located within the vehicle. The system allows users to signal an agent of an emergency contact center to call for help in an emergency and live stream the ongoing emergency to a security professional, police, etc. In addition, the system features integrated GPS mechanisms to ensure location services are enabled and the rideshare customer and driver can be tracked during an emergency. It also prevents kidnappings and serious injuries from occurring while using the rideshare service.

BRIEF DESCRIPTION OF DRAWINGS

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others to best utilize the present invention and various embodiments with various modifications as are suited to the particular use contemplated.

FIG. 1 depicts a schematic diagram of the vehicle surveillance and safety system for transport services according to another embodiment.

DETAILED DESCRIPTION OF THE INVENTION

Car Surveillance System is a safety system for rideshare vehicles. The system enables clients to remain safe and protected when purchasing trips on the service. The system integrates into existing rideshare software applications and communicates with a cellular network connected to the camera audiovisual device in a vehicle.

In an emergency, the user can press a panic button on the application. The dash camera then activates to live stream audio and video to emergency service personnel who can simultaneously track the vehicle's location. The system maximizes safety for both passengers and drivers.

Note, in addition, that the word "alarm" and the term "distress signal" are used interchangeably throughout the rest of the disclosure to explain the invention. Also, note that the "alarm" or "distress signal" may be "sent" or "transmitted:" to the "emergency contact center." Consequently, the use of the word "alarm," and term "distress signal," as well as the use of the words "transmitted" and "sent," and the terms "panic button," and "emergency contact center," etc. are all used for illustrative purposes only.

Note, in addition, that the word "rideshare" and the term "transport service" are used interchangeably throughout the rest of the disclosure to explain the invention. Also, note that the "live stream" or maybe "broadcasted" to the "emergency contact center." Consequently, the use of the word "rideshare," and term "transport service," as well as the term "live stream" and "broadcast" including the variations of the word "broadcast," are all used for illustrative purposes only.

Turning to the FIGURE, FIG. 1 depicts a schematic block diagram of a process through which the distress signal may go according to the teachings of the invention. The process starts when the emergency contact receives the triggering signal from the mobile device. After receiving the triggering signal, the mobile device will start broadcasting the driver and passengers to an agent in an emergency contact center.

When the panic button is pressed, it will begin transmitting a distress signal to an emergency contact center. If the person becomes separated from the cellular telephone, the person may still be found because the GPS is located within the audiovisual device and continuously sending a live video stream to the emergency contact center. If, for example, an abductor or thief takes the cellular telephone from the person and for whatever reason abandons the person or discards the mobile device, the passengers or the abductor will still be found as long as one of parties remain in the vehicle.

Note that although the invention uses a GPS that is already embedded into the mobile device. The location of the rideshare driver and passengers is found via a signal transmitted from the mobile device. This signal is triggered automatically after a person in the transport service vehicle presses the panic button within an application on the mobile device.

Depending on how conspicuous the transport service driver's or passenger mobile device is a carjacker or abductor, for example, may not know they are being live streamed to an emergency contact center. Therefore, the location of the vehicle will be tracked. Furthermore, all the individuals in view of at least one mobile device activated by panic button in the mobile device application can be identified and monitored by an agent of the emergency contact center.

If the driver or passengers are incapacitated and cannot respond or communicate the person will still be monitored by an agent and still receive emergency assistance.

Once the panic button is pressed only the agent monitoring the driver and passengers in the rideshare vehicle can end the livestream video. The agent may choose to end the livestream after assessing the situation and documenting it or simply making a judgment call to end the live stream after monitoring the situation during ridesharing.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of integrating communication between a transport service mobile application and an emergency contact center security agent and a mobile cellular device via a cellular connection, the method comprising the steps of:
   inconspicuous sending by a person a signal through a security and surveillance mobile application indicating the person is in an emergency situation while using a transport service;
   the signal initiates and notifies the emergency contact center security agent;
   the security and surveillance mobile application simultaneously begins streaming to said emergency contact center security agent via an audiovisual device;
   said emergency contact center security agent monitors an audiovisual live stream;
   said emergency contact center security agent continues to monitor the audiovisual live stream as an intermediary until the emergency is resolved; and
   the livestream ends after agent documents emergency situation;
   wherein only said emergency contact center security agent is enabled to terminate said audiovisual live stream and said audiovisual live stream continues until terminated by said contact center security agent.

2. The method of claim 1 further comprising determining the location of the transport service vehicle after inconspicuously pressing a panic button in a mobile application via a mobile cellular device.

3. The method according to claim 2 wherein the agent of said emergency contact center security agent contacts an emergency service provider.

4. The method of claim 1 wherein a panic button is embedded within a mobile application on at least one of a transport service driver mobile device or a passenger mobile device, and once said panic button is pressed only said emergency contact center security agent can terminate said audiovisual live stream.

5. The mobile devices as set forth in claim 4 wherein inconspicuously pressing a panic button activates the security and surveillance system.

6. The Method according to claim 1 wherein the emergency contact center security agent ends the live stream at the discretion of said emergency contact center security agent.

7. The method according to claim 6 when the emergency contact center security agent ends the live stream from the audiovisual device via an agent's monitoring software.

8. A vehicle safety and surveillance emergency monitoring method, the method comprising:
   receiving, at a contact center, from a mobile device operating one of a driver application and a rider application, a triggering signal indicating that a panic button has been pressed for the one of the driver and the rider application;
   receiving, at a contact center, from a mobile device camera corresponding with the mobile device, an audio and video stream;
   establishing, at the contact center, communications with a first one of an emergency services center and a rideshare emergency response line; and
   continuing ongoing reception, at the contact center, of the audio and video stream from the mobile device camera until the contact center sends a termination signal to the mobile device camera for terminating the audio and video stream;
   wherein only the contact center can terminate the audio and video live stream.

9. The method of claim 8, further comprising:
   establishing, at the contact center, communications with a second one of the emergency services center and the rideshare emergency response line.

10. The method of claim 8, further comprising:
    sending, from the contact center, a termination signal to the mobile device camera for terminating the audio and video stream.

11. The method of claim 8, further comprising:
    determining, by the contact center, a current location of the mobile device camera based on data received from the mobile device camera.

12. The method of claim 11, further comprising:
    continued determining, by the contact center, the current location of the mobile device camera based on the data received from the mobile device camera.

13. The method of claim 11, wherein:
    for the receiving, at the contact center, from a mobile device operating one of the driver application and the rider application, the mobile device is operating a first one of the driver application and the rider application; and
    for the receiving, at the contact center, from a mobile device camera corresponding with the mobile device, the mobile device camera is a mobile device camera of a mobile device operating a second one of the driver application and the rider application;
    wherein the first one and the second one of the driver application and the rider application are the same application, such that the same mobile device sends the triggering signal and transmits the audio and video stream.

14. The method of claim 11, wherein:
    for the receiving, at the contact center, from a mobile device operating one of the driver application and the rider application, the mobile device is operating a first one of the driver application and the rider application; and
    for the receiving, at the contact center, from a mobile device camera corresponding with the mobile device, the mobile device camera is a mobile device camera of a mobile device operating a second one of the driver application and the rider application;
    wherein the first one and the second one of the driver application and the rider application are different ones of the driver application and the rider application, such that a different mobile device sends the triggering signal than the mobile device that transmits the audio and video stream.

15. The method of claim 8, wherein:
    the mobile device camera comprises a camera audiovisual device of a car surveillance system of a rideshare vehicle.

16. A vehicle safety and surveillance emergency monitoring method, the method comprising:
    receiving, at a mobile device operating one of a driver application and a rider application, an indication that a panic button has been pressed for the one of the driver application and the rider application;
    in response to the receiving the indication, sending to a contact center, from the mobile device a triggering signal indicating that the panic button has been pressed for the one of the driver and the rider application;

in response to the receiving the indication, sending from the mobile device, to a mobile device camera corresponding with the mobile device, a command for the mobile device camera to continually transmit an audio and video stream to a contact center until the mobile device camera receives from the control center a command to terminate the audio and video stream; and repeatedly transmitting, to the contact center from the mobile device, data for a current location of the mobile device;

wherein only the contact center can terminate the audio and video live stream.

17. The method of claim 16, wherein:

for the receiving the indication, at the mobile device, the mobile device is operating a first one of the driver application and the rider application; and for the sending to the mobile device camera corresponding with mobile device, the mobile device camera is a mobile device camera of a mobile device operating a second one of the driver application and the rider application;

wherein the first one and the second one of the driver application and the rider application are the same application, such that the same mobile device sends the triggering signal and transmits the audio and video stream.

18. The method of claim 16, wherein:

for the receiving the indication, at the mobile device, the mobile device is operating a first one of the driver application and the rider application; and for the sending to the mobile device camera corresponding with mobile device, the mobile device camera includes a mobile device operating a second one of the driver application and the rider application;

wherein the first one and the second one of the driver application and the rider application are the same application, such that the mobile device that sends the triggering signal is different from a mobile device that transmits the audio and video stream.

19. The method of claim 16, wherein:

for the sending to the mobile device camera corresponding with the mobile device, the mobile device camera comprises a camera audiovisual device of a car surveillance system of a rideshare vehicle.

20. The method of claim 16, wherein:

for the sending to the mobile device camera corresponding with the mobile device, the mobile device camera further sends instructions to the mobile device camera to transmit data for the current location of the mobile device camera.

* * * * *